United States Patent
You et al.

(10) Patent No.: US 10,229,670 B2
(45) Date of Patent: *Mar. 12, 2019

(54) METHODS AND SYSTEMS TO TRAVERSE GRAPH-BASED NETWORKS

(71) Applicant: Intel Corporation, Santa Clara, CA (US)

(72) Inventors: Kisun You, Seoul (KR); Christopher J. Hughes, Cupertino, CA (US); Yen-Kuang Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 13/925,150

(22) Filed: Jun. 24, 2013

(65) Prior Publication Data

US 2014/0156274 A1    Jun. 5, 2014

Related U.S. Application Data (63) Continuation of application No. 12/637,228, filed on Dec. 14, 2009, now Pat. No. 8,484,154.

(51) Int. Cl.
*G06N 7/00* (2006.01)
*G10L 15/06* (2013.01)
(Continued)

(52) U.S. Cl.
CPC ............ *G10L 15/063* (2013.01); *G06N 7/005* (2013.01); *G10L 15/02* (2013.01); *G10L 15/083* (2013.01); *G10L 15/34* (2013.01); *G10L 15/19* (2013.01)

(58) Field of Classification Search
CPC ...................................................... G06N 7/005
(Continued)

(56) References Cited

FOREIGN PATENT DOCUMENTS

CN    1560834 A    1/2005
JP    H07-302246 A    11/1995
(Continued)

OTHER PUBLICATIONS

Nguyen et al ("CI-GBI: A Novel Approach for Extracting Typical Patterns from Graph-Structured Data" 2005.*
(Continued)

*Primary Examiner* — Lut Wong
(74) *Attorney, Agent, or Firm* — Schwabe, Williamson & Wyatt, P.C.

(57) ABSTRACT

Methods and systems to translate input labels of arcs of a network, corresponding to a sequence of states of the network, to a list of output grammar elements of the arcs, corresponding to a sequence of grammar elements. The network may include a plurality of speech recognition models combined with a weighted finite state machine transducer (WFST). Traversal may include active arc traversal, and may include active arc propagation. Arcs may be processed in parallel, including arcs originating from multiple source states and directed to a common destination state. Self-loops associated with states may be modeled within outgoing arcs of the states, which may reduce synchronization operations. Tasks may be ordered with respect to cache-data locality to associate tasks with processing threads based at least in part on whether another task associated with a corresponding data object was previously assigned to the thread.

17 Claims, 8 Drawing Sheets

Implicitly Modeled Self-Loop Information (51) Int. Cl.
*G10L 15/34* (2013.01)
*G10L 15/08* (2006.01)
*G10L 15/02* (2006.01)
*G10L 15/19* (2013.01)

(58) Field of Classification Search
USPC .......................................... 706/52; 718/103
See application file for complete search history.

(56) References Cited

FOREIGN PATENT DOCUMENTS

JP  2001-256107 A  9/2001
JP  2008-186171 A  8/2008

OTHER PUBLICATIONS

European Search Report received for European Patent Application No. 10251914.7, dated Nov. 22, 2012, 5 Pages.
European Office Action received for European Patent Application No. 10251914.7 dated Jan. 10, 2013, 10 Pages.
Office Action received for Japanese Patent Application No. 2010-276067, dated May 29, 2012, 4 pages of Office Action and 4 page of English Translation.
Office Action received for Japanese Patent Application No. 2010-276067, dated Apr. 23, 2013, 6 Pages of Office Action Including 3 pages of English Translation.
Office Action received for Japanese Patent Application No. 2010-276067, dated Sep. 3, 2013, 8 pages of Office action and 4 Pages of English Translation.
Office Action Received for Chinese Patent Application No. 201010610101.2, dated Nov. 5, 2012, 12 pages of Office Action Including 5 pages of English Translation and 2 Pages of Search Report.
Office Action received for Chinese Patent Application No. 201010610101.2, dated Jan. 31, 2012, 3 Pages of Chinese Office Action and 5 pages of English Translation.
Chona et al. "Data-Parallel Large Vocabulary Continuous Speech Recognition on Graphics Processors", May 2008, pp. 1-13.
Chong et al., "Scalable HMM based Inference Engine in Large Vocabulary Continuous Speech Recognition", IEEE International Conference on Multimedia and Expo, Jun. 28-Jul. 3, 2009, 4 Pages.
Dixon et al., "Harnessing graphics processors for the fast computation of acoustic likelihoods in speech recognition", Computer Speech and Language, Elsevier, vol. 23, Mar. 31, 2009, pp. 510-526.
Feng et al. "Parallelization and Characterization of SIFT on Multi-Core Systems", 2008, pp. 14-23.
Hori et al. "Efficient WFST-Based One-Pass Decoding With On-The-Fly Hypothesis Rescoring in Extremely Large Vocabulary Continuous Speech Recognition", vol. 15, No. 4, May 2007, pp. 1352-1365.
You et al. "Parallel Scalability in Speech Recognition" IEEE Signal Processing Magazine, IEEE Service Center, Piscataway, NJ, US vol. 26, No. 6, Nov. 2009, pp. 124-135.
Kumar et al., "Carbon: Architectural Support for Fine-Grained Parallelism on Chip Multiprocessors", ACM Proceedings of the 34th Annual International Symposium on Computer Architecture, San Diego California, XP007911680, ISBN: 978-1-59593-706-3, Jun. 9-13, 2007, pp. 162-173.
Girija J. Narlikar, "Scheduling Threads for Low Space Requirement and Good Locality", Technical Report of the School of Computer Science at Carnegie Mellon University, CMU-CS-99-121, XP002686014, May 1999, 23 Pages.
Nguyen et al., "CI-GBI: A Novel Approach for Extracting Typical Patterns from Graph-Structured Data", 2005, pp. 639-649.
Philbin et al., "Thread Scheduling for Cache Locality", 7th, International Conference on Architectural Support for Programming Languages and Operation Systems, Cambridge, MA, vol. 7, Oct. 1, 1996, pp. 60-71.
Phillips et al., "Parallel Speech Recognition", International Journal of Parallel Programming, vol. 27, No. 4, 1999, pp. 257-288.
Huang et al. "Spoken Language Processing: A Guide to Theory, Algorithm, and System Development", USA, Prentice Hall PTR, May 5, 2001, 15 pages.
You et al., "Exploring Design Space for Parallel Scalability", Inference engines in large vocabulary continuous speech recognition, IEEE Signal Processing Magazine, Nov. 2009, pp. 1-13.
Notice of Grant received for Chinese Patent Application No. 201010610101.2, dated Jun. 26, 2013, 2 pages of English Translation and 2 pages of Chinese Notice of Grant.

\* cited by examiner

Implicitly Modeled Self-Loop Information

FIG. 8

Explicitly Modeled Self-Loop Information

METHODS AND SYSTEMS TO TRAVERSE GRAPH-BASED NETWORKS

BACKGROUND

Speech feature extractors have been developed to generate a stream of feature vectors representative of an audio stream.

Graph-based speech recognition networks have been developed to relate a stream of speech-based feature vectors to a sequence of words of a written language.

Inference engines have been developed to iteratively traverse states of a graph-based speech recognition network in response to a stream of speech-based feature vectors to identify a corresponding sequence of words.

Speech recognition systems have been developed using weighted finite state transducers (WFSTs), including large vocabulary continuous speech recognition (LVCSR) systems.

State-based network traversal techniques have been implemented in a multi-thread fashion and in a single instruction, multiple data (SIMD) fashion. States of a speech recognition network may include self-loops, which are conventionally treated as an additional incoming loop to the corresponding states. In multi-thread and SIMD processing environments, synchronization may thus be necessary even where a state includes only one incoming arc plus a self-loop. In addition, state based SIMD traversal techniques may not fully utilize SIMD processing lanes, which may result in vector inefficiencies. This may offset benefits of SIMD processing.

Generic dynamic task scheduling techniques have been developed for multi-processor systems. Such generic techniques may not be optimal for some applications, such as traversal of speech recognition networks.

BRIEF DESCRIPTION OF THE DRAWINGS/FIGURES

In the drawings, the leftmost digit(s) of a reference number identifies the drawing in which the reference number first appears.

DETAILED DESCRIPTION

Figure 1:
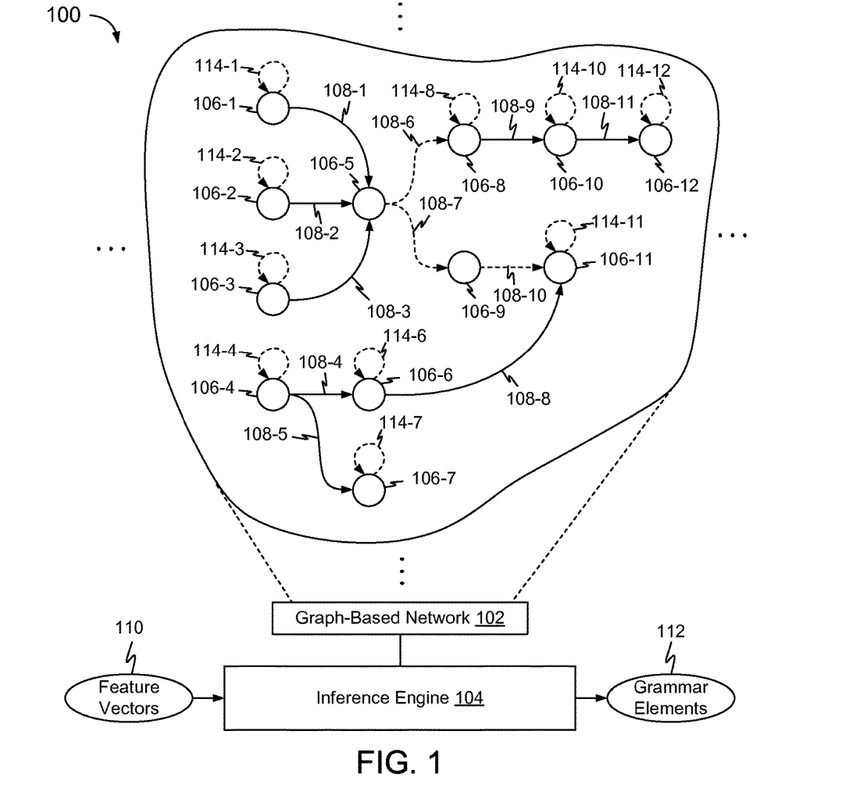
FIG. 1 is a block diagram of a graph-based network and an inference engine.

FIG. 1 is a block diagram of a system 100, including a graph-based network 102 and an inference engine 104.

Network 102 includes a plurality of states 106 and arcs 108 amongst states 106 to translate input labels of arcs 108, corresponding to a sequence of states of the network, to a list of output grammar elements of arcs 108, corresponding to a sequence of grammar elements Inference engine 104 is configured to iteratively traverse network 102 in response to a stream of feature vectors 110.

Feature vectors 110 may represent one or more of continuous speech, a sequence of images, such as a sequence of video frames or a video clip, and continuous text. Feature vectors 110 may be generated from one or more continuous and/or discrete signals, which may include one or more of speech embedded within an acoustic signal, visual images embedded in a video signal, and text characters and formatting information embedded within a computer readable signal. An audio based feature vector 110 may represent an utterance, a portion of a word, or a sound. A video based feature vector 110 may represent one or more of motion, color, objects, and/or changes thereto between frames. Each feature vector 110 may include a plurality of fields to hold information associated with a corresponding portion or frame of a signal.

The grammar may correspond to a written language, which may include one or more of a human readable language and a computer readable language.

System 100 may correspond to a speech and/or video recognition system to translate audio and/or video to a written language. Alternatively, or additionally, system 100 may correspond to a language translation system to translate from a first written language to a second written language. One or more of the first and second written languages may correspond to a spoken language and/or a computer readable language.

Inference engine 104 may be configured to identify, and iteratively refine one or more sequences of states 106 and corresponding arcs 108, together referred to herein as a path, in response to a stream of feature vectors 110. States 106 and/or arcs 108 identified during a given iteration as potentially corresponding to feature vector stream 110 are referred to herein as active states 106 and active arcs 108 of the iteration.

During a given iteration, a set of active states 106 may be identified that are reachable through multiple sets of active arcs 108. In other words, multiple paths may include a common set of states 106, traversed along non-identical sets of arcs 108.

Inference engine 104 may be configured to associate probability measures with states 106 and arcs 108, representative of a likelihood of the states 106 and arcs 108 corresponding to feature vector stream 110.

Inference engine 104 may be configured to represent states 106 and/or arcs 108 with one or more data objects, and may be configured to update the corresponding data objects as network 102 is traversed. Processing of a state 106 and/or an arc 108, may include processing the corresponding data object.

A state 106 from which an arc 108 originates is referred to herein as an originating state 106. A state 106 to which an arc 108 is directed is referred to herein as a destination state 106.

System 100 may correspond to a large vocabulary continuous speech recognition (LVCSR), to recognize words from a relatively large vocabulary, which may include exponential permutations and unknown boundary segmentation between words.

A most probable word sequence $\hat{W}$ for a sequence of observed audio features O, given a set of possible word sequences W, may be represented mathematically as:

$$\hat{W} = {}^*\arg{}_W\max\{P(O|W)P(W)\}.$$

The product of audio features and prior likelihood for the word sequence W, P(O|W)P(W), may be computed using a dynamic programming recurrence, such as with a Viterbi search algorithm.

The likelihood of the traversal process being in a state j with word sequence $w_{tj}$ at a time t may be derived from the likelihood in preceding states as:

$$\psi_t(s_j; w_{tj}) = \max_i \{\psi_{t-1}(s_i; w_{(t-1)j}) \cdot a_{ij} \cdot b(O_t; m_k)\},$$

where $a_{ij}$ is a transition probability from a state i ($s_i$) to a state j ($s_j$), and $b(O_t; m_k)$ is an observation probability of a context-dependent state k ($m_k$) on transition from state i ($s_i$) to state j ($s_j$).

Inference engine 104 may process the algorithm iteratively over a sequence of time steps, where the likelihood of a word or grammar element sequence in each time step depends on the likelihood computed in a preceding time step. In each iteration there may be multiple, perhaps thousands of active states 106, which represent most likely alternative interpretations of feature vectors 110. A most likely set of states 106 may be selected at the end of stream of feature vectors 110.

Network 102 may be generated in accordance with a weighted finite state transducer (WFST). A WFST is a Mealy finite state machine (FSM) represented by a list of arcs 108, Each include a plurality of properties, such as described further below.

Network 102 may include multiple hierarchical knowledge sources or models, which may include one or more of a Hidden Markov Model (HMM) acoustic model H, a context model C, a pronunciation lexicon of words L, and a language model G, which may be composed into a H-C-L-G WFST, referred to herein as an H-level network. The combined WFST may be optimized using FSM minimization techniques, and used as a flattened FSM representation for the recognition network. WFST may simplify the recognition process by flattening the hierarchical knowledge sources offline into a single level FSM to traverse at run time.

In an H-level WFST, individual arcs 108 may be associated with corresponding elements of the grammar. Inference engine 104 may translate a sequence of HMM states, as a list of input labels on arcs, to a sequence of words, as a list of output words on arcs.

In a H-level WFST, one or more arcs 108 may include:
an input label or symbol that is consumed when the arc 108 is traversed;
an output label or word to which an input label is translated;
a source state;
a destination state; and
an inherent likelihood of following the arc from the source state.

One or more states 106 may include:
a pointer to a first outgoing arc 108 from the state 106;
an indication of a number of outgoing arcs 108 from the state 106; and
an indication of a number of outgoing epsilon arcs from the state 106.

Epsilon arcs are described below with respect to FIG. 2.

Arcs 108 may be maintained in an array, and may be grouped by originating states 106.

During a WFST-based search, a set of most likely paths through network 102 may be tracked for a set of input symbols or feature vectors 110. Information for each path may be associated with a head of the corresponding path. The information may include a set of output symbols along the path, such as words identified as potentially matching feature vectors 110, and a corresponding accumulated likelihood of the path.

The information may be maintained in a data structure, which may include a pointer to a set of output symbols, and an accumulated likelihood value. The data structure may be associated with a state 106, such as where one or more states 106 include a self-loop 114. Alternatively, the data structure may be associated with a corresponding arc 108, such as where self-loop information is modeled within one or more arcs 108, described below with respect to FIGS. 6-9.

A WFST-based inference engine may be application agnostic, such that it may be employed in other domains such as text and image processing.

Arcs 108 may include epsilon arcs and non-epsilon arcs, illustrated in FIG. 1 with hashed lines and solid lines, respectively. Epsilon arcs are traversed without consuming any input symbols. Non-epsilon arcs consume one input symbol to perform a state transition. For an H-level WFST recognition network, input labels of network 102 represent context-dependent HMM states.

Figure 2:
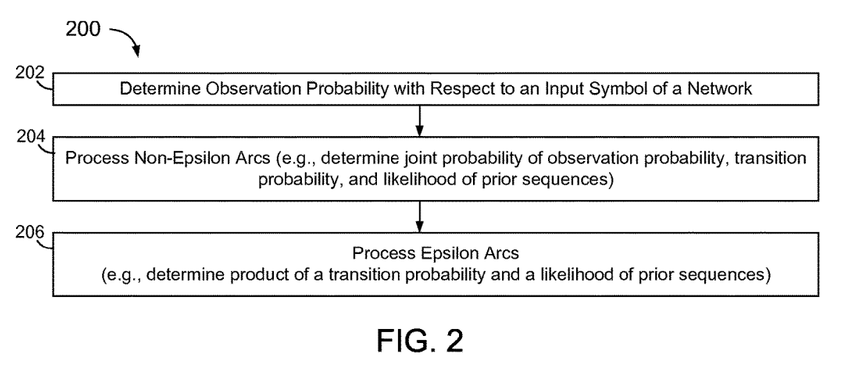
FIG. 2 is a process flowchart of a method of traversing a graph-based network.

FIG. 2 is a process flowchart of a method 200 of traversing network 102 in response to an input frame or feature vector 110 during an iteration.

At 202, an observation probability is determined with respect to an input symbol of network 102. The observation probability may include a likelihood measure of an input feature vector matching an acoustic input symbol, such as by computing a distance function. The observation probability may be determined in accordance with a Gaussian mixture model of context-dependent states. Determination of the observation probability at 202 may include, and may consist essentially or solely of computing input symbols on outgoing arcs of active states. Determination of the observation probability may include referencing an acoustic model of network 102.

At 204, non-epsilon arcs are processed. Processing of non-epsilon arcs may include computing a joint probability of:
- an observation probability of the current input $b(O_t; m_k)$ computed at 202;
- a transition probability or weight of the arc being traversed $a_{ij}$ referenced from network 102; and
- a likelihood of prior sequences, or the source state cost $\psi_{t-1}(s_i; w_{(t-1)_j})$, computed in a preceding iteration at time t−1.

The joint probability may be determined at 204 as a product of the observation probability, the transition probability, and the likelihood. The joint probability may be determined at 204 as an addition of logarithmic values.

At 206, epsilon arcs are processed. Since epsilon arcs do not have input symbols, probabilities may be computed as a product of a transition probability and a likelihood of prior sequences.

At 204 and/or 206, a cost of a destination state may be updated with a cost of the most likely incoming corresponding non-epsilon and epsilon arcs for that state. The cost may be determined in accordance with a Viterbi approximation.

Network 102 may include a chain of consecutive epsilon arcs, such as epsilon arcs 108-7 and 108-10 in FIG. 1. Processing of epsilon arcs at 206 may include traversing all outgoing epsilon arcs from each destination state until a state with no outgoing epsilon arcs is reached.

Multiple input symbols, such as thousands of input symbols, may be utilized to compute the observation probability at 202. Multiple arc transitions, such as tens of thousands of arc transitions, may be traversed through network 102 during processing of non-epsilon arcs at 204 and epsilon arcs at 206.

Method 200 may be repeated for additional input frames or feature vectors 110.

Traversal Techniques

Inference engine 104 may be configured to traverse network 102 with respect to active states and/or active arcs.

Active state traversal operates on a state-by-state basis. Active state traversal may be performed with respect outgoing arcs 108 of active states 106, referred to herein as active state propagation. Alternatively, or additionally, active state traversal may be performed with respect to incoming arcs 108 of candidate active states 106 of a next iteration, referred to herein as active state aggregation. A state 106 may be defined as a candidate active state of a next iteration when an incoming arc 108 to the state originates from an active state 106 of a current iteration.

With active state propagation, for each active state 106, outgoing arcs 108 are evaluated and results are propagated to corresponding destination states 106.

With active state aggregation, incoming arcs 108 of candidate active states 106 are evaluated and the corresponding candidate active states 106 are updated in accordance with results of the evaluating.

Active arc traversal operates on an arc-by-arc basis, wherein active arcs 108 are updated with parameters retrieved from corresponding originating states, and the updated active arcs 108 are used to update corresponding destination states 106. Active arc traversal may be performed with respect to outgoing arcs of active states, referred to herein as active arc propagation, or with respect to incoming arcs of candidate active states, referred to herein as active arc aggregation. Methods and systems to perform active arc traversal are disclosed below with respect to FIGS. 3-5.

Parallel Processing Techniques

Inference engine 104 may be configured to iteratively traverse network 102 with data level parallelism, such as in a single-instruction, multiple-data (SIMD) environment, and/or thread level parallelism, such as in a multi-processor or multi-core environment.

With active state traversal in a SIMD environment, arcs 108 associated with a state 106 may be associated with a SIMD work unit or vector, and the arcs 108 may be processed in parallel SIMD processing lanes. In a WFST-based search graph, some states may have a relatively large number of outgoing arcs while other states may have relatively few outgoing arcs. This may result in relatively low and/or inconsistent SIMD utilization.

With active arc traversal in a SIMD environment, a plurality of arcs 108 may be associated with a SIMD work unit or vector, independent of the corresponding source or destination states 106. This may provide relatively consistent SIMD vector unit efficiency.

With active state traversal in a multi-thread environment, arcs 108 associated a first active state 106 may be assigned to a first one of a plurality of processing threads, arcs 108 associated with a second active state 106 may be assigned to a second one of the processing threads, and the first and second threads may be processed in parallel.

With active arc traversal in a multi-thread environment, active arcs 108 may be assigned to processing threads independent of the corresponding states 106.

With thread level parallelism, tasks may be pre-assigned to particular threads prior to run-time. Alternatively, or additionally, a dynamic task manager may be configured to assign tasks to the threads at run-time based at least in part on data location information, such as disclosed below with reference to FIGS. 9-12.

Synchronization

Where active states or active arcs are propagated in parallel, such as in a SIMD environment and/or a multi-thread environment, and where multiple arcs are directed to a common destination state, write conflict resolution may be provided from an underlying platform, such as atomic updates. Methods and systems to reduce instances where synchronization may be needed are disclosed below with respect to FIGS. 6-8.

Where incoming arcs 108 of an active state 106 are aggregated in parallel, a corresponding update of the active state may include a reduction of evaluation results of the incoming arcs 108. The reduction may explicitly manage potential write conflicts with additional algorithmic steps such that write conflict resolution support is not needed from an underlying platform.

Active Arc Traversal

Figure 3:
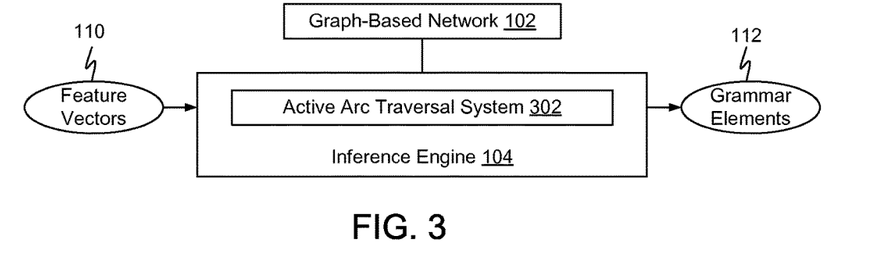
FIG. 3 is a block diagram of the system of FIG. 1, wherein the inference engine includes an active arc traversal system.

FIG. 3 is a block diagram of system 100, wherein inference engine 104 includes an active arc traversal system 302 to traverse or iterate over active arcs 108 of network 102. As described further below, active arc traversal system 302 may be configured to traverse active arcs using SIMD computations across arcs from multiple active states, which may permit substantially full utilization of even very wide vector units.

Figure 4:
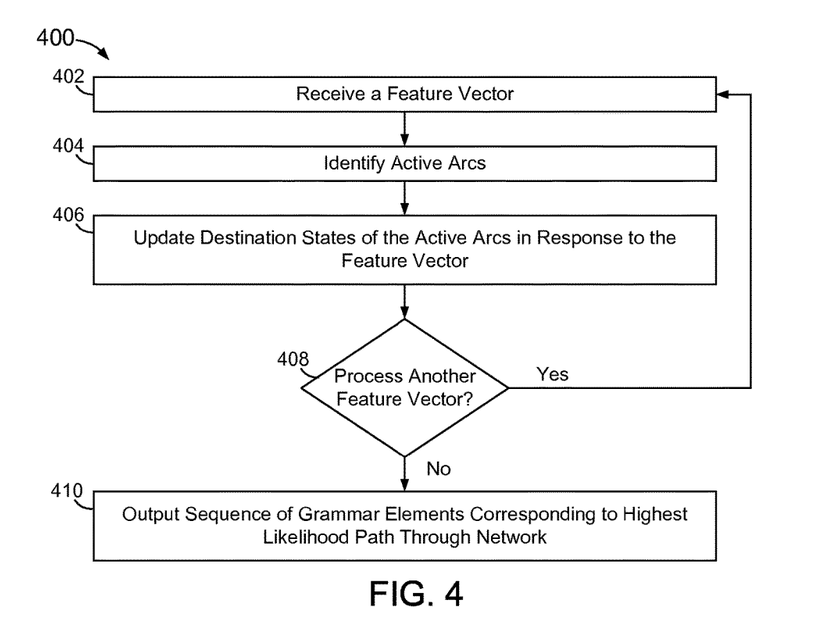
FIG. 4 is a process flowchart of a method of processing active arcs.

FIG. 4 is a process flowchart of a method 400 of processing active arcs. Method 400 is described below with respect to system 100 as illustrated in FIG. 3. Method 400 is not, however, limited to the example of FIG. 3.

At 402, a feature vector 110 is received at inference engine 104.

At 404, active arcs 108 of network 102 are identified by active arc traversal system 302. Active arcs may be identified as outgoing arcs of active states, or active arc propagation, and/or as incoming arcs of candidate active states, or active arc aggregation.

At 406, destination states 106 of the identified active arcs 108 are updated by active arc traversal system 302, in response to the feature vector 110 received at 402.

At 408, processing may return to 402 to receive one or more additional feature vectors 110.

At 410, when processing of features vectors 110 is complete, a sequence of grammar elements 112, corresponding to a highest likelihood path through network 102, is output by inference engine 104.

Figure 5:
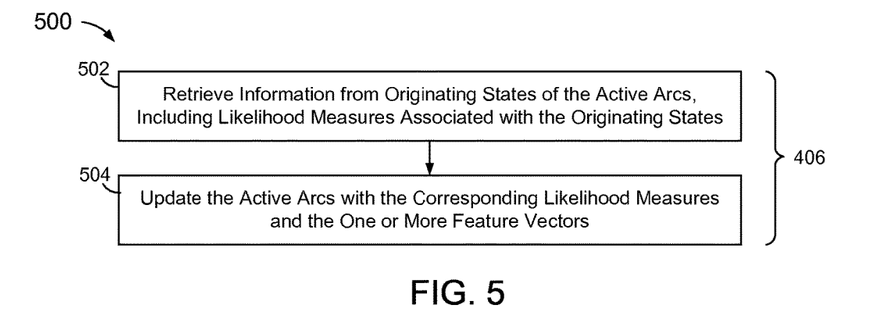
FIG. 5 is a process flowchart of a method of updating a destination state of a graph-based network.

FIG. 5 is a process flowchart of a method 500 of updating a destination state 106, such as described above with respect to 406.

At 502, information is retrieved from originating states 106 of the active arcs 108, including likelihood measures associated with the originating states 106.

At 504, the active arcs are updated with the corresponding information retrieved at 502 and the one or more feature vectors 110 received at 402.

Inference engine 104 may be configured to process active arcs 108 in a SIMD fashion. For example, the retrieving of information at 502 and the updating of the active arcs at 504 may be performed with respect to multiple arcs in a SIMD fashion. A work unit manager may be configured to associate a plurality of arcs 108 as a unit of work to be processed in across a set of SIMD processing lanes. Arcs 108 from multiple source states 106, directed to a common destination state, may be processed in a SIMD fashion.

Processing of active arcs in a SIMD fashion may permit substantially full use of a corresponding vector unit, and may provide greater vector efficiency relative to processing of active states in a SIMD fashion.

Modeling of Self-Loops within Outgoing Arcs

In FIG. 1, multiple active states 106 and/or active arcs 108 may propagate information to a common destination state 106 during a traversal iteration. When the multiple active states 106 and/or active arcs 108 are processed simultaneously or in parallel, such as in thread-level and/or data-level parallel processing, synchronization of the updates of the corresponding destination state may be necessary.

One or more states 106 of network 102 may include a self-loop 114. A WFST search graph, for example, may include self-loops 114 due to characteristics of an underlying hidden Markov Model (HMM).

Self-loops 114 may be processed as incoming arcs of corresponding states 106, which may necessitate synchronization of updates to a state 106 even where the state 106 has only one incoming active arc 108.

Synchronization may be performed in conjunction with atomic update hardware. Alternatively, or additionally, a privatization scheme may be employed. A privatization scheme may involve an additional process to merge private results. Synchronization and privatization operations may consume processing resources and time.

In an embodiment, self-loops 114 may be omitted or removed from one or more states 106, and modeled within one or more corresponding outgoing arcs 108.

Self-loops 114 may be omitted or removed from all states 106 having self-loops 114, or a subset thereof, such as from states 106 having only one incoming arc 108. Self-loops 114 may be modeled only within non-epsilon arcs 108. Removal or omission of self-loops 114 from a state 106 having only one incoming arc 108 may reduce or eliminate a need to synchronize an update to the state 106.

Modeling of a self-loop 114 within an outgoing arc 108 may include modifying a data structure associated with the arc 108 to store self-loop information.

Self-loop information may include inherent likelihood or probability information. Self-loop inherent likelihood information may be implicitly modeled within an outgoing arc 108, such as by modifying inherent likelihood information of the outgoing arc 108 with self-loop inherent likelihood information. Alternatively, self-loop inherent likelihood information may be explicitly modeled within an outgoing arc 108, such as by modifying the outgoing arc 108 to include a field to store an indication of whether the arc 108 includes self-loop information, and one or more additional fields to store self-loop information.

Traversal of a corresponding network may include one or more additional computations during each iteration to process self-loop information within outgoing arcs 108. The additional computations may be performed when processing the corresponding outgoing arcs 108, such as described below with respect to FIGS. 6-9.

Network 102 may be initially generated with self-loops 114, and one or more of the self-loops 114 may be removed and remodeled within corresponding outgoing arcs 108. Network 102 may be optimized subsequent to removal and remodeling of self-loop information within outgoing arcs 108. The subsequent optimization may merge relatively large numbers of states 106, which may improve traversal efficiency. Optimization may include one or more FSM minimization techniques, such as described above.

Alternatively, an H transducer may be generated at the outset without explicit self-loops 114, and with self-loop information modeled within outgoing arcs 108. Composition and/or other optimization procedures may then be performed to provide a WFST network 102. Optimization may merge relatively large numbers of states 106.

Figure 6:
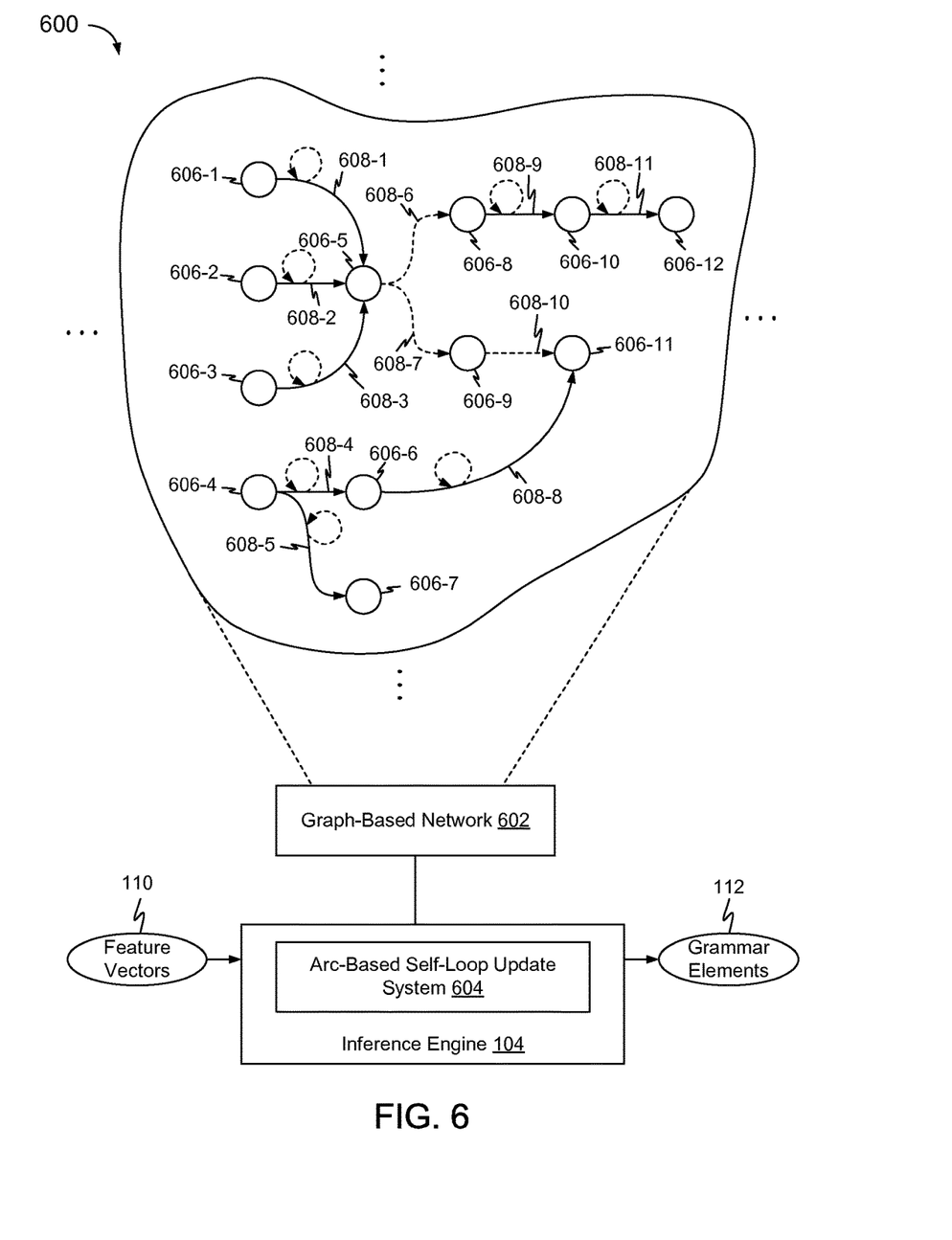
FIG. 6 is a block diagram of another graph-based network and inference system, wherein self-loop information is modeled within outgoing arcs of corresponding states.

FIG. 6 is a block diagram of a graph-based network and inference system 600 including a network 602, wherein self-loop information is modeled within outgoing non-epsilon arcs 608-1 through 608-5, 608-8, and 608-11 of corresponding states 606. Self-loops 114 of FIG. 1 are omitted from corresponding states 606.

An inference engine 604 may include an arc-based self-loop update system 604 to update self-loop information modeled within arcs of network 602, such as described below with respect to one or more of FIGS. 7 through 9.

Figure 7:
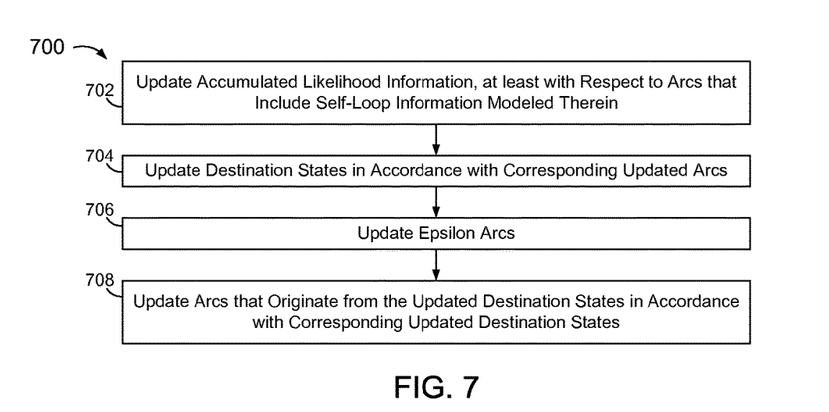
FIG. 7 is a process flowchart of a method of traversing a network when self-loop information is modeled within at least a portion of arcs of the network.

FIG. 7 is a process flowchart of a method 700 of traversing a network when self-loop information is modeled within at least a portion of arcs of the network.

At 702, accumulated likelihood information is updated, at least with respect to arcs that have self-loop inherent likelihood information modeled therein. As described below with respect to FIG. 9, some arcs 108, such as epsilon arcs 608-6, 608-7, and 608-8 in FIG. 6, may not include self-loop information, and may thus may omitted from the updating at 702.

At 704, destination states of the updated arcs are updated in accordance with the corresponding updated arcs. Updating of the destination states at 704 may be performed subsequent to the updating at 702. Where a destination state is to be updated in response to multiple incoming arcs at 704, updating at 704 may include synchronizing of the updates.

At 706, epsilon arcs may be updated.

At 708, arcs that originate from destination states updated at 704, are updated in accordance with the updated destination states. Updating of the arcs at 708 may be performed subsequent to updating of all destination states at 704.

Figure 8:
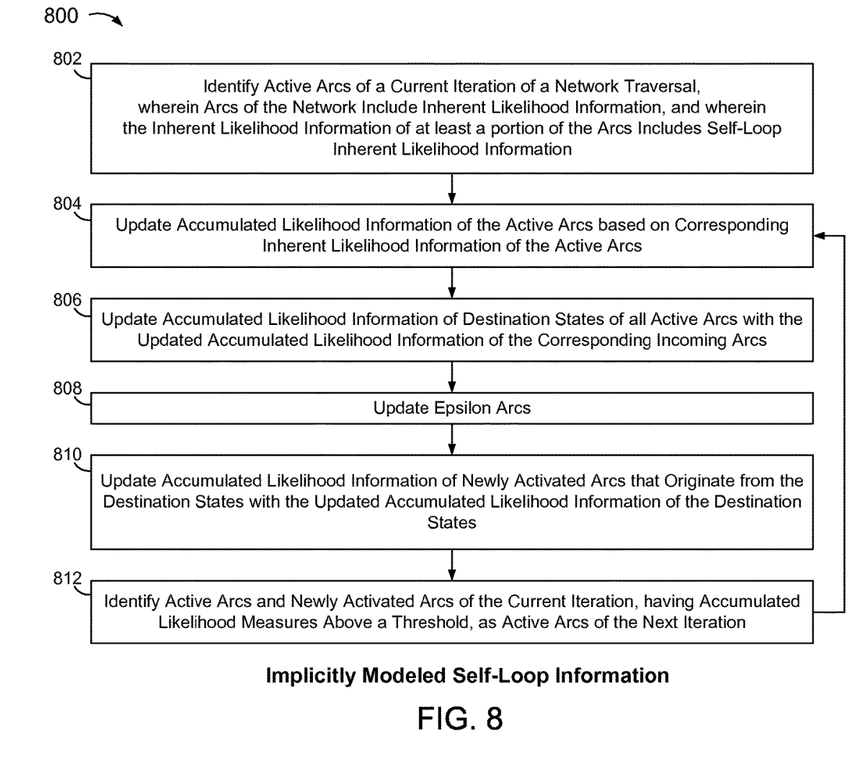
FIG. 8 is a process flowchart of a method of traversing a network when inherent likelihood information of a portion of arcs of the network is modified to include self-loop inherent likelihood information.

FIG. 8 is a process flowchart of a method 800 of traversing a network when inherent likelihood information of at least a portion of the arcs is modified to include self-loop inherent likelihood information.

At 802, active arcs of a current iteration are identified.

At 804, accumulated likelihood information of all of the active arcs, or of at least all of the active non-epsilon arcs, is updated based on corresponding inherent likelihood information. This essentially performs self-loop updating with respect to arcs that include self-loop inherent likelihood information.

At 806, accumulated likelihood information of destination states of the active arcs is updated with the updated accumulated likelihood information of the corresponding active arcs.

Where method 800 is implemented in a parallel processing environment, such as thread-level and/or data-level parallel processing environment, and where a state is updated in response to multiple incoming active arcs, updating of destination states at 806 may include synchronizing updates associated with multiple incoming arcs. Since self-loop information is modeled within arcs rather than states, synchronization may be omitted with respect to states that are updated in response to a single incoming active arc.

At 808, epsilon arcs may be updated.

The updating of accumulated likelihood information at 806 may activate one or more outgoing arcs of the updated destination states. Such arcs are referred to herein as newly activated arcs. At 810, accumulated likelihood information of newly activated arcs is updated with the updated accumulated information of the corresponding destination states updated at 806. Updating of newly activated arcs at 810 may be performed subsequent to processing of all active arcs at 806.

Method 800, or portions thereof, may be iteratively repeated until all active arcs and corresponding destination states are updated. In subsequent iterations, processing of active arcs at 804 and 806 may include newly activated arcs identified in a prior iteration at 812.

One or more active arcs, including newly activated arcs, may be omitted from further processing in subsequent iterations, such as when a corresponding accumulated likelihood value is below a threshold.

Figure 9:
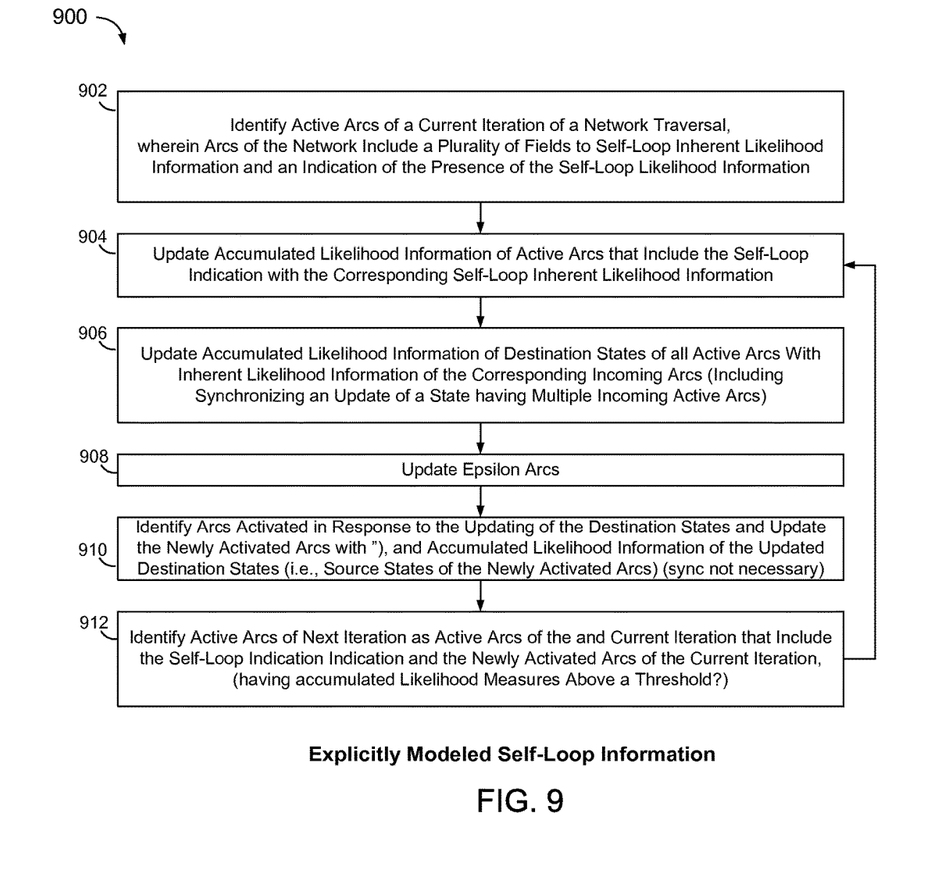
FIG. 9 is a process flowchart of a method of traversing a network when arcs of the network include a plurality of fields to hold self-loop inherent likelihood information and an indication of a presence of the self-loop inherent likelihood information.

FIG. 9 is a process flowchart of a method 900 of traversing a network when arcs of the network include a plurality of fields to hold self-loop inherent likelihood information and an indication of a presence of the self-loop inherent likelihood information.

At 902, active arcs of a current iteration are identified.

At 904, accumulated likelihood information of active arcs that include the indication of the presence of self-loop inherent likelihood information is updated based on corresponding self-loop inherent likelihood information within the arc. This essentially performs self-loop updating only with respect to arcs that include the indication of the presence of self-loop inherent likelihood information.

At 906, accumulated likelihood information of destination states of all of the active arcs, or of at least all of the active non-epsilon arcs, is updated with the updated accumulated likelihood information of the corresponding active arcs.

Updating of destination states at 906 may include synchronizing updates associated with multiple incoming arcs, such as described above with respect to method 800.

At 908, epsilon arcs may be updated.

At 910, accumulated likelihood information of newly activated arcs is updated with the updated accumulated information of the corresponding destination states updated at 906, such as described above with respect to 810.

Method 900, or portions thereof, may be iteratively repeated until all active arcs and corresponding destination states are updated, such as describe above with respect to method 800.

Cache-Aware Dynamic Task Ordering

In a multi-processor environment, dynamic task scheduling may be utilized to balance a workload amongst multiple processing threads.

Conventional task scheduler heuristics may not be optimal in some environments, such as WFST-based searches. For example, where a data object, such as an active state or an active arc is to be processed in a current iteration or frame, and where the data object was processed in a prior iteration, data associated with the data object may remain cached at a location associated with a thread to which the data object was previously processed. It would be useful to process the data object in the same thread in the current iteration, as the existing cached data may reduce or eliminate the need to re-retrieve or re-calculate the cached data. Conventional dynamic task scheduler heuristics do not, however, attempt to assign a data object to the same thread to which the data object was previously assigned.

Disclosed herein are methods and systems to order tasks based on data localities, referred to herein as dynamic cache-aware task ordering. Dynamic cache-aware task ordering associates tasks with threads based at least in part on data cache locality of corresponding data objects.

Also disclosed herein are methods and systems to search a WFST-based network using dynamic cache-aware task ordering techniques disclosed herein.

Cache-aware dynamic task ordering may include implicit cache-aware task scheduling or explicit cache-aware task scheduling.

Implicit cache-aware task scheduling may order tasks in a queue to implicitly or indirectly cause a dynamic task manager to assign the tasks to particular threads. Queue ordering may be based on a heuristic of the task manager, such as described below with respect to FIGS. 10 and 12.

Explicit cache-aware task scheduling may identify a thread to which a data object was previously processed, and explicitly assign a new task associated with the data object to the same thread, such as described below with respect to FIGS. 11 and 13.

Figure 10:
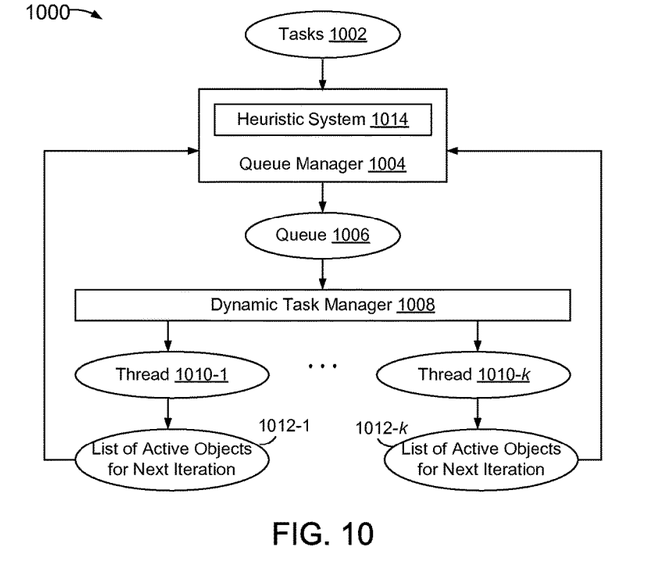
FIG. 10 is a block diagram of an implicit cache-aware environment, including a queue manager to order tasks in a task queue, and a dynamic task manager to schedule tasks from task queue amongst a plurality of processing threads.

FIG. 10 is a block diagram of an implicit cache-aware environment 1000, including a queue manager 1004 to order tasks 1002 in a task queue 1006, and a dynamic task manager 1008 to schedule tasks 1002 from task queue 1006 amongst a plurality of processing threads 1010.

Tasks 1002 may be associated with active states 106 and/or active arcs 108. During processing of tasks 1002, threads 1010 may generate lists 1012 of active states 106 and/or active arcs 108 of a subsequent iteration. Corresponding new tasks 1002 may be defined with respect to the active states 105 and/or active arcs 108 identified in lists 1012.

At least a portion of the active states 106 and/or active arcs 108 of the subsequent iteration, as identified in lists 1012, may already be active in a current iteration with the corresponding threads 1010.

Queue manager 1004 may be configured to arrange tasks 1002 within queue 1006, based on lists 1012 in which corresponding states 106 and/or arcs 108 are identified, to cause dynamic task manager 1008 to assign tasks 1002 to the threads 1012 that initiated the tasks 1002. Where a state 106 and/or arc 108 is active in consecutive iterations, corresponding tasks 1002 may thus be assigned to the same thread 1010.

For example, a task 1002 associated with an arc 108 may be assigned to thread 1010-1 during a current iteration. In processing the task 1002 during the current iteration, thread 1010-1 may generate list 1012-1 to indicate that the arc 108 is to be active in the subsequent iteration. A new task 1002 corresponding to the arc 108 may be invoked for the subsequent iteration, and queue manager 1004 may place the new task 1002 in queue 1006 to cause dynamic task scheduler to assign the new task 1002 to thread 1010-1.

Queue manager 1004 may include a heuristic system 1014 to order tasks 1002 in queue 1002 in accordance with a heuristic used by dynamic task manager 1008, so as to influence thread assignment of dynamic task manager 1008.

For example, task manager 1008 may be configured to assign tasks 1002 to threads 1010 in a round-robin fashion, wherein a first task 1002 is assigned to thread 1010-1, a second task 1002 is assigned to a thread 1010-2, and subsequent tasks 1002 are assigned to subsequent threads 1010, in a circular fashion. Similarly, queue manager 1004 may be configured to place tasks 1002 in queue 1006 in a round-robin fashion, and in accordance with lists 1012. For example, a task 1002 from list 1012-1 may be assigned to queue 1006 first, followed by a task 1002 from a list 1012-2, followed by subsequent tasks 1002 from subsequent lists 1012.

As another example, dynamic task manager 1008 may be configured to retrieve a group of tasks 1002 from queue 1006, to separate the group of tasks 1002 into multiple sets of contiguous tasks 1002, and to sequentially assign each set of contiguous tasks 1002 to threads 1010 in a round robin fashion. Where queue 1006 includes eight tasks 1002, A through H, for example, and where threads 1010 include four threads, 1010-1 through 1010-4, dynamic task manager 1008 may assign tasks A and B to thread 1010-1, tasks C and D to thread 1010-2, tasks E and F to thread 1010-3, and tasks G and H to thread 1010-4. Queue manager 1004 may be configured to arrange tasks A through H in queue 1006, in view of the lists 1012 from which tasks A through H are initiated.

Figure 11:
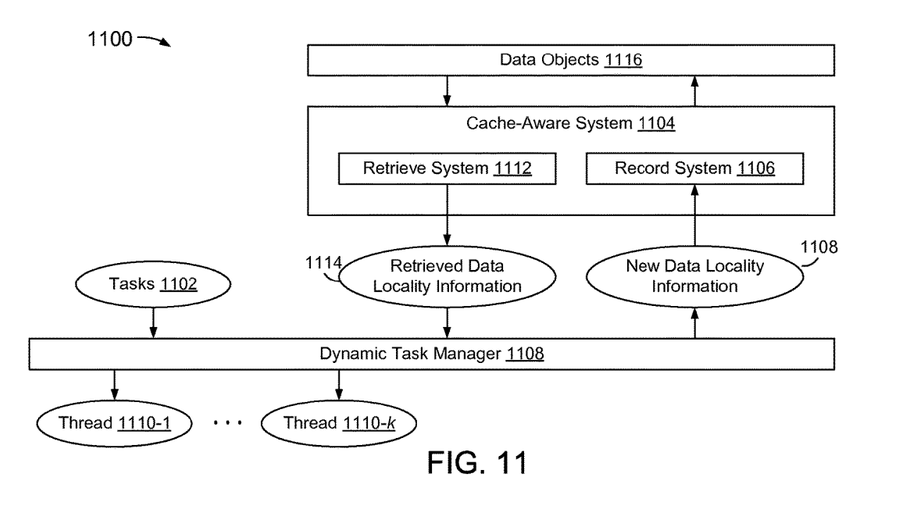
FIG. 11 is a block diagram of an explicit cache-aware environment, including a cache-aware system to associate data locality information with data objects, and a dynamic task manager to assign tasks to processing threads based at least in part on the data locality information.

FIG. 11 is a block diagram of an explicit cache-aware environment 1100, including a cache-aware system 1104 to manage data locality information, and a dynamic task manager 1008 to assign tasks 1002 to processing threads 1110 based at least in part on the data locality information.

Cache aware system 1104 may include a record system 1106 to receive data locality information 1108 from dynamic task manager 1108 when a task 1102 is assigned to a thread 1110. Data locality information 1108 may identify the thread 1110 to which the task 1102 is assigned, which may correspond to a cache location where data associated with a corresponding data object 1116 is cached.

Record system 1106 may be configured to associate the data locality information 1108 with the data object 1116 to which the task 1102 is directed. The data object 1116 may represent a state 106 and/or an arc 108, and may include a field to record corresponding data locality identification 1108.

Cache aware system 1104 may include a retrieve system 1112 to retrieve data locality information 1114 associated with a data object 1116, when a task 1102 associated with the data object 1116 is to be assigned to a thread 1110.

Dynamic task manager 1108 may be configured to assign tasks 1102 to threads 1110 based at least in part on retrieved data locality information 1114.

Dynamic task manager 1108 may be configured to take into account one or more other factors in assigning tasks 1102 to threads 1110, such as to balance processing loads amongst threads 1110.

Cache aware system 1104 and dynamic task manager 1108 may be implemented separately or may be integrated together.

Figure 12:
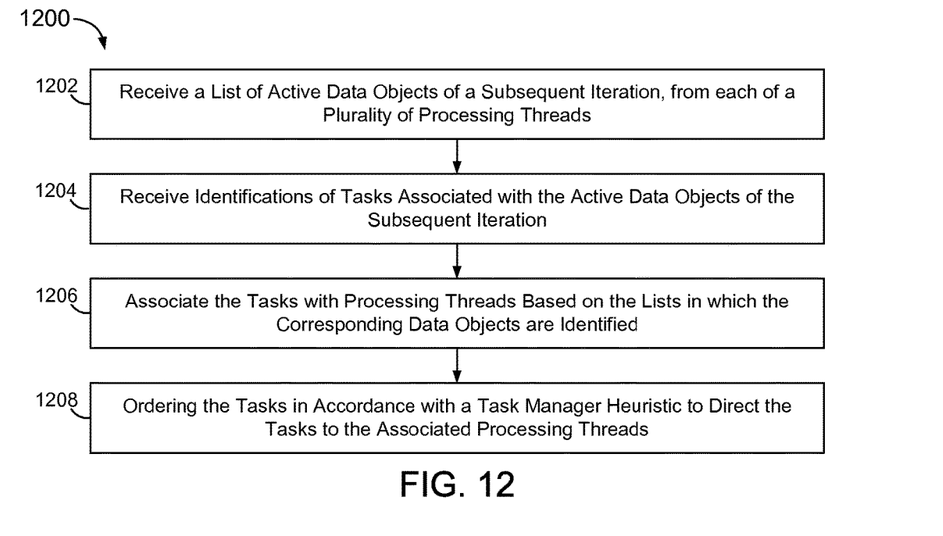
FIG. 12 is a process flowchart of a method of ordering tasks based on data locality information.

FIG. 12 is a process flowchart of a method 1200 of ordering tasks based at least in part on data locality information. Method 1200 may be implemented as described above with respect to FIG. 10. Method 1200 is not, however, limited to the example of FIG. 10.

At 1202, a list of active data objects of a subsequent iteration is received from each of a plurality of processing threads. The data objects may represent arcs and/or states of a graph-based network.

At 1204, tasks associated the active data objects of the subsequent iteration are received.

At 1206, the tasks are associated with processing threads based on the lists in which the corresponding data objects are identified.

At 1208, the tasks are ordered in accordance with a task manager heuristic to direct the tasks to the associated processing threads. The tasks may be ordered within a task queue, from which the task manager assigns the tasks to the threads.

Figure 13:
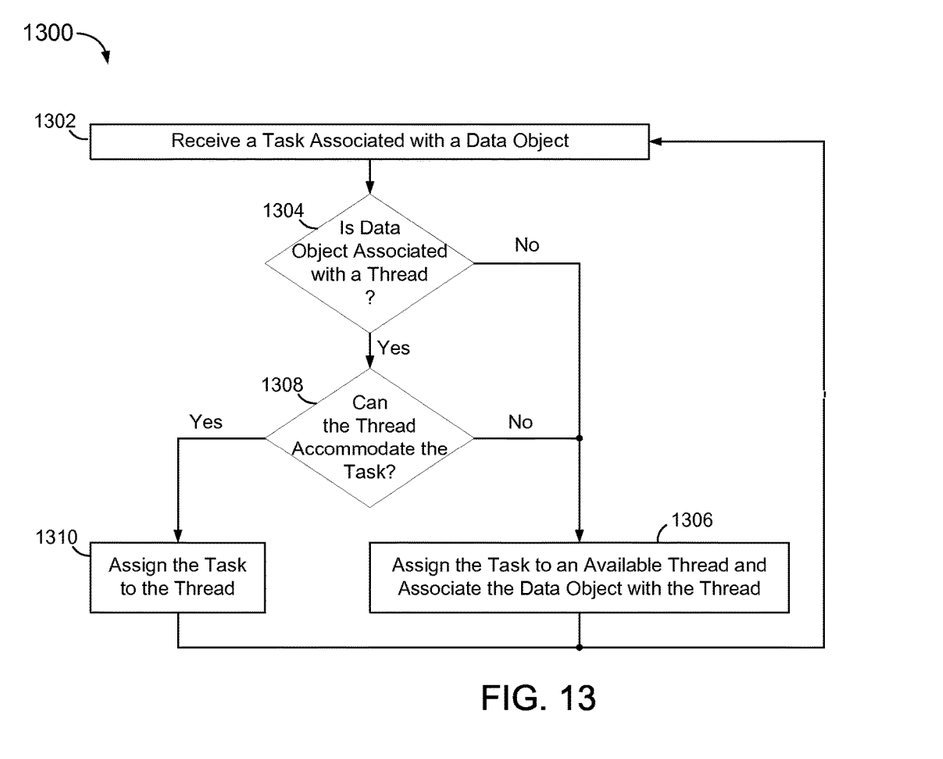
FIG. 13 is a process flowchart of a method of assigning tasks to processing threads based at least in part on data locality information.

FIG. 13 is a process flowchart of a method 1300 of assigning tasks to processing threads based at least in part on data locality information. Method 1300 may be implemented as described above with respect to FIG. 11. Method 1300 is not, however, limited to the example of FIG. 11.

At 1302, a task is received. The task may be associated with a data object representative of a state or an arc of a graph-based network.

At 1304, a determination is made as to whether the data object is associated with a thread. This may include determining whether cache data locality information, such as a thread identification, is associated with the data object.

Where the data object is not associated with a thread, processing proceeds to 1306, described further below.

Where the task is associated with a thread, another determination is made at 1308.

At 1308, if the thread can accommodate the task, the task is assigned to the thread at 1310. If the thread cannot accommodate the task, or where another thread is better suited for the task based on one or more other considerations, processing proceeds to 1306.

At 1306, the data object is assigned to a thread based on one or more other factors, and corresponding cache data locality information is associated with the data object. The cache data locality information may include an indication of the thread to which the task is assigned.

Thereafter, when the data object is the subject of another task at 1302, the task may be assigned to the same thread at 1310.

Active arc based traversal, processing of self-loop information modeled within arcs, cache-aware dynamic task ordering, may be implemented alone and/or in various combinations with one another.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 14:
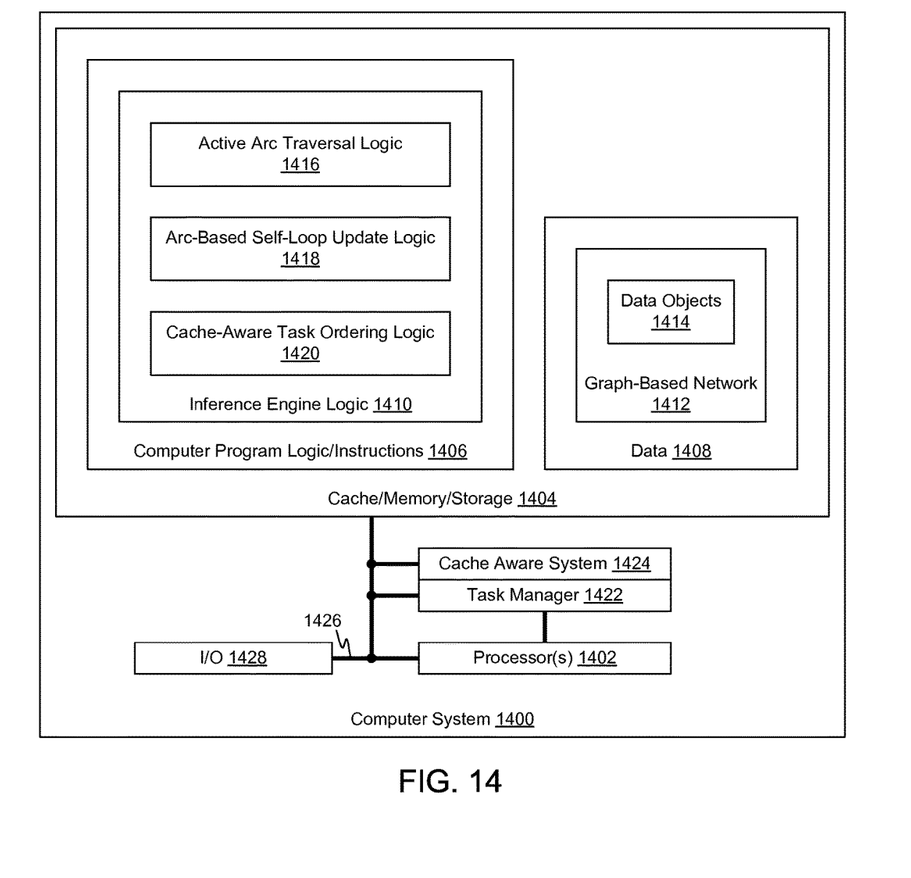
FIG. 14 is a block diagram of a computer system configured to traverse a graph-based network.

FIG. 14 is a block diagram of a computer system 1400, configured to traverse a graph-based network.

Computer system 1400 may include one or more computer instruction processing units, illustrated here as a processor or core 1402, to execute computer program logic.

Computer system 1400 may further include cache, memory, and/or storage (hereinafter "memory") 1404, including a computer readable medium having computer program product logic or instructions 1406 stored thereon, to cause processor 1402 to perform one or more functions in response thereto.

Memory 1404 further includes data 1408 to be used by processor 1402 in executing instructions 1406, and/or generated by processor 1402 in response to execution of instructions 1406.

In the example of FIG. 14, logic 1406 includes inference engine logic 1410 to cause processor 1404 to traverse a graph-based network 1412, such as described in one or more examples above. Network 1412 may correspond to network 102 in FIG. 1, or network 602 in FIG. 6. Network 1412 may include data objects 1414 to represent one or more of states and arcs of network 1412.

Inference engine logic 1410 may include active arc traversal logic 1416 to cause processor 1402 to traverse active arcs of network 1412, such as described above with respect to one or more of FIGS. 1-5.

Where self-loop information is modeled within arcs of network 1410, inference engine logic 1410 may include arc-based self-loop update logic 1418 to cause processor 1402 to update the self-loop information, such as described above with respect to one or more of FIGS. 6-9.

Computer system 1400 may include a dynamic task manager 1420 to schedule or assign tasks to processing threads at run-time. Dynamic task manager 1422 may correspond to one or more of dynamic task manager 1008 in FIG. 10 and dynamic task manager 1108 in FIG. 11.

Where computer system 1400 includes dynamic task manager 1422, inference engine logic 1410 may include cache-aware ordering logic 1420 to cause processor 1402 to order tasks associated with data objects based on processing threads to which prior tasks associated with the data objects are assigned. Cache-aware ordering logic 1420 may include logic to order the threads in accordance with a heuristic of task manager 1422, to cause task manager 1422 to assign the tasks to the corresponding threads, such as described above with respect to one or more of FIGS. 10 and 12. Cache-aware ordering logic 1418 may correspond to queue manager 1004 in FIG. 10. Cache-aware ordering logic 1418 may be implemented external of inference engine logic 1410, and may be implemented independent of inference engine logic 1410.

Alternatively, dynamic task manager 1422 may be explicitly configured to assign tasks to threads based on data locality information associated with data objects 1414, and computer system 1400 may further include a data-locality management system 1424 to associate the data locality information with data object 1414, and to retrieve and provide the data locality information to dynamic task manager 1422, such as described above with respect to one or more of FIGS. 11 and 13. Data-locality management system 1424 may correspond to cache-aware system 1104 in FIG. 11. Data-locality management system 1424 may be implemented in hardware, firmware, logic 1406, and combinations thereof Computer system 1400 may include a communications infrastructure 1426 to provide one or more communication paths within computer system 1400.

Computer system 1400 may include an input/output controller 1428 to provide one or more communication paths between computer system 1400 and one or more other systems.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A method for recognizing speech, comprising:
iteratively traversing a graph-based speech recognition network in response to a stream of speech-based feature vectors to translate input labels of arcs of the graph-based speech recognition network, corresponding to a sequence of states of the graph-based speech recognition network, to a list of output grammar elements of the arcs, corresponding to a sequence of grammar elements of a language; and
ordering tasks associated with data objects that represent states or arcs for parallel execution in a plurality of processing threads, wherein the ordering of tasks is based at least in part on the processing threads to which prior tasks associated with the data objects were assigned;
wherein the ordering includes:
receiving a list of active data objects of a subsequent iteration from each of the processing threads;
receiving identifications of tasks associated with the active data objects of the subsequent iteration;
associating each of the tasks with one of the processing threads based on the list in which the corresponding data object is identified; and
ordering the tasks in accordance with a task manager heuristic to direct the tasks to the associated processing threads.

2. The method of claim 1, wherein the ordering includes:
assigning a first task associated with a data object to a first one of the processing threads in a current iteration;
associating an identification of the first processing thread with the data object;
receiving a second task associated with the data object; and
assigning the second task to the first processing thread based at least in part on the identification of the first processing thread associated with the data object.

3. The method of claim 1, wherein the iteratively traversing includes:
propagating active arcs of the network, including updating destination states of the active arcs in response to a feature vector.

4. The method of claim 3, wherein the propagating of the active arcs includes:
retrieving information associated with originating states of the active arcs, including a likelihood measure associated with the originating states;
updating the active arcs with the likelihood measures of the corresponding originating states and the feature vector; and
updating the corresponding destination states in accordance with the updated active arcs.

5. The method of claim 1, further including:
modeling self-loop information corresponding to each of a plurality of the states within one or more outgoing arcs of the corresponding states.

6. The method of claim 5, wherein the self-loop information includes inherent likelihood information, and wherein the modeling includes:
modifying inherent likelihood information of an outgoing arc with the self-loop inherent likelihood information.

7. The method of claim 5, wherein the self-loop information includes inherent likelihood information, and wherein the modeling includes:
modifying a data object representative of an outgoing arc to include a plurality of fields to hold the self-loop inherent likelihood information and an indication of a presence of the self-loop inherent likelihood information.

8. The method of claim 1, wherein the arcs include inherent likelihood information, wherein at least a portion of the arcs further include self-loop inherent likelihood information, and wherein traversing includes:
identifying a set of active arcs;
updating accumulated likelihood information of at least a subset of the set of active arcs that include the self-loop inherent likelihood information, based at least on the corresponding self-loop inherent likelihood information;
propagating accumulated likelihood information of the set of active arcs during a first propagating phase, subsequent to the updating of the accumulated likelihood information;
propagating accumulated likelihood information to newly activated arcs in a second propagating phase subsequent to the first propagating phase, wherein the newly activated arcs include one or more outgoing arcs of one or more states updated during the first propagating phase;
revising the set of active arcs to include the newly activated arcs and to omit arcs having an accumulated likelihood value below a threshold; and
repeating the updating, the first propagating phase, and the second propagating phase with respect to the revised set of active arcs.

9. The method of claim 8, wherein the inherent likelihood information of the portion of the arcs is modified to include the corresponding self-loop inherent likelihood information, and wherein the updating includes:
updating the accumulated likelihood information of all active arcs within the set of active arcs based on the inherent likelihood information of the corresponding arcs.

10. The method of claim 8, wherein at least non-epsilon arcs of the network each include a first set of one or more fields to hold the inherent likelihood information of the arc, a second set of one or more fields to hold self-loop inherent likelihood information, and a self-loop indicator field to hold a self-loop indication when the second set of one or more fields is populated with self-loop inherent likelihood information, and wherein the updating includes:
identifying the subset of arcs within a current set of active arcs as arcs that include the self-loop indication; and
updating the accumulated self-loop inherent likelihood information only with respect to the identified subset of the active arcs.

11. A non-transitory computer readable medium encoded with a computer program that includes instructions to cause a processor to:
iteratively traverse a graph-based speech recognition network in response to a stream of speech recognition feature vectors to translate input labels of arcs of the graph-based speech recognition network, corresponding to a sequence of states of the graph-based speech recognition network, to a list of output grammar elements of the arcs, corresponding to a sequence of grammar elements of a language; and
order tasks associated with data objects that represent the states or the arcs to execute in parallel in a plurality of threads, wherein the ordering of tasks is based on processing threads to which prior tasks associated with the data objects were assigned;
wherein to order task includes:
assign a first task associated with a data object to a first one of the processing threads in a current iteration;
associate an identification of the first processing thread with the data object;
receive a second task associated with the data object; and
assign the second task to the first processing thread based at least in part on the identification of the first processing thread associated with the data object.

12. The non-transitory computer readable medium of claim 11, further including instructions to cause the processor to:
receive a list of active data objects of a subsequent iteration from each of the processing threads;
receive identifications of tasks associated with the active data objects of the subsequent iteration;
associate each of the tasks with one of the processing threads based on the list in which the corresponding data object is identified; and
order the tasks in accordance with a task manager heuristic to direct the tasks to the associated processing threads.

13. The non-transitory computer readable medium of claim 11, further including instructions to cause the processor to:
propagate active arcs of the network, including updating destination states of the active arcs in response to a feature vector.

14. The non-transitory computer readable medium of claim 11, further including instructions to cause the processor to:
model self-loop information corresponding to each of a plurality of the states within one or more outgoing arcs of the corresponding states.

15. The non-transitory computer readable medium of claim 11, wherein the arcs include inherent likelihood information, wherein at least a portion of the arcs further include self-loop inherent likelihood information, and wherein the computer program further includes instructions to cause the processor to:
identify a set of active arcs;
update accumulated likelihood information of at least a subset of the set of active arcs that include the self-loop inherent likelihood information, based at least on the corresponding self-loop inherent likelihood information;

propagate accumulated likelihood information of the set of active arcs during a first propagating phase, subsequent to the updating of the accumulated likelihood information;

propagating accumulated likelihood information to newly activated arcs in a second propagating phase subsequent to the first propagating phase, wherein the newly activated arcs include one or more outgoing arcs of one or more states updated during the first propagating phase;

revise the set of active arcs to include the newly activated arcs and to omit arcs having an accumulated likelihood value below a threshold; and repeat the updating, the first propagating phase, and the second propagating phase with respect to the revised set of active arcs.

16. An apparatus for recognizing speech, comprising a processor and memory to:

iteratively traverse a graph-based speech recognition network in response to a stream of speech recognition feature vectors to translate input labels of arcs of the graph-based speech recognition network, corresponding to a sequence of states of the graph-based speech recognition network, to a list of output grammar elements of the arcs, corresponding to a sequence of grammar elements of a language; and order tasks associated with data objects that represent the states or the arc for execution in parallel in a plurality of threads, wherein the ordering of tasks is based on processing threads to which prior tasks associated with the data objects were assigned;

wherein to order tasks, the processor and memory are further to:

receive a list of active data objects of a subsequent iteration from each of the processing threads;

receive identifications of tasks associated with the active data objects of the subsequent iteration;

associate each of the tasks with one of the processing threads based on the list in which the corresponding data object is identified; and order the tasks in accordance with a task manager heuristic to direct the tasks to the associated processing threads.

17. The apparatus of claim 16, wherein the processor and memory are further to:

assign a first task associated with a data object to a first one of the processing threads in a current iteration;

associate an identification of the first processing thread with the data object;

receive a second task associated with the data object; and assign the second task to the first processing thread based at least in part on the identification of the first processing thread associated with the data object.

* * * * *